US012607433B2

(12) United States Patent (10) Patent No.: US 12,607,433 B2
Huang et al. (45) Date of Patent: Apr. 21, 2026

(54) METHOD, APPARATUS, TERMINAL, AND STORAGE MEDIUM FOR IMAGE PROCESSING

(71) Applicant: WUHAN GUIDE SENSMART TECH CO., LTD., Wuhan (CN)

(72) Inventors: Cheng Huang, Wuhan (CN); Yu Zhou, Wuhan (CN); Qing Ma, Wuhan (CN); Jie Li, Wuhan (CN)

(73) Assignee: WUHAN GUIDE SENSMART TECH CO., LTD., Wuhan (CN)

( * ) Notice: Subject to any disclaimer, the term of this patent is extended or adjusted under 35 U.S.C. 154(b) by 383 days.

(21) Appl. No.: 18/189,233

(22) Filed: Mar. 24, 2023

(65) Prior Publication Data

US 2023/0228524 A1 Jul. 20, 2023

Related U.S. Application Data

(63) Continuation of application No. PCT/CN2022/100994, filed on Jun. 24, 2022.

(30) Foreign Application Priority Data

Dec. 16, 2021 (CN) .......................... 202111561658.6

(51) Int. Cl.
*G06V 10/25* (2022.01)
*F41G 1/38* (2006.01)
*G06T 5/20* (2006.01)
*G06T 5/70* (2024.01)
*G06V 10/00* (2022.01)
*G06V 10/75* (2022.01)

(52) U.S. Cl.
CPC .................. *F41G 1/38* (2013.01); *G06T 5/20* (2013.01); *G06T 5/70* (2024.01); *G06V 10/00* (2022.01); *G06V 10/25* (2022.01); *G06V 10/751* (2022.01)

(58) Field of Classification Search
None
See application file for complete search history.

(56) References Cited

U.S. PATENT DOCUMENTS

| | | | |
|---|---|---|---|
| 12,322,111 B2 * | 6/2025 | Lin .......................... | G06V 10/44 |
| 2017/0310946 A1 * | 10/2017 | Ge .......................... | H04N 13/275 |
| 2020/0186682 A1 * | 6/2020 | Robison .................... | G06T 5/70 |
| 2023/0228524 A1 * | 7/2023 | Huang ...................... | G06T 5/20 |
| | | | 42/119 |

* cited by examiner

*Primary Examiner* — Randolph I Chu

(57) ABSTRACT

A method and device for image processing, a terminal and a storage medium. The method includes acquiring an image generated by an infrared sighting telescope arranged on a firearm; determining a grey level dynamic range of a preset first portion of the image; if a difference value between the grey level dynamic range value and the grey level of the preset second portion reaches a preset starting processing threshold, performing mean filtering processing on each pixel of the preset second portion to obtain a filtered grey level; and if the filtered grey level is greater than a preset grey level expectation threshold, processing the pixel, so that the grey level of the pixel is close to the grey level expectation value.

8 Claims, 3 Drawing Sheets

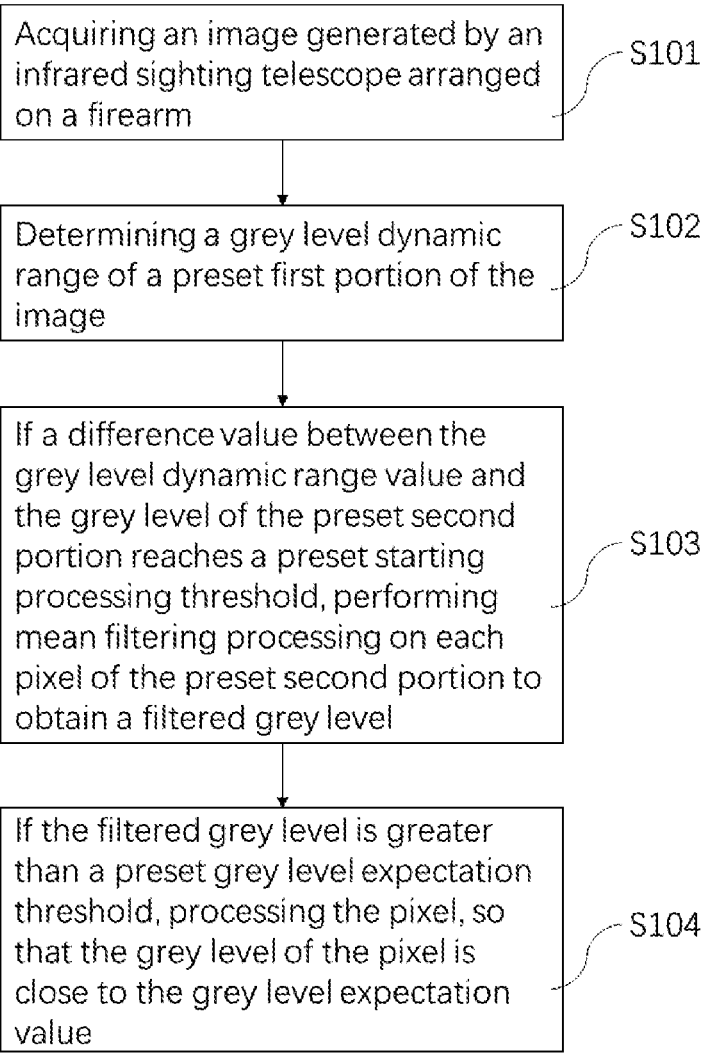

Acquiring an image generated by an infrared sighting telescope arranged on a firearm — S101

Determining a grey level dynamic range of a preset first portion of the image — S102

If a difference value between the grey level dynamic range value and the grey level of the preset second portion reaches a preset starting processing threshold, performing mean filtering processing on each pixel of the preset second portion to obtain a filtered grey level — S103

If the filtered grey level is greater than a preset grey level expectation threshold, processing the pixel, so that the grey level of the pixel is close to the grey level expectation value — S104

Fig. 1

| |
|---|
| Computer program |
| Storage medium |

Fig. 4

METHOD, APPARATUS, TERMINAL, AND STORAGE MEDIUM FOR IMAGE PROCESSING

FIELD OF THE DISCLOSURE

The present invention relates to the technical field of image processing, and more particularly, to a method and apparatus for image processing, a terminal and a storage medium.

BACKGROUND OF THE DISCLOSURE

In the process of firearm aiming, besides the mechanical gunsight with three points and one line, the infrared sighting telescope can also be selected for aiming. The sighting telescope uses the near-infrared light source to irradiate the target, and the target reflects the infrared light, so that the photoelectric conversion imaging can be performed for aiming at night. However, the heat of the barrel increases after shooting, which may cause the heat around the barrel to form bright spots in the infrared sighting telescope, thus affecting the normal use of the infrared sighting telescope, and even directly blocking the view images when getting serious. Currently, for this situation, it is often necessary to wait for the cooling of the barrel. The cooling time is long. The shooting opportunity will be missed during the cooling process.

Thus, there is a need for a better solution to solve the problems of the prior art.

SUMMARY OF THE DISCLOSURE

In view of the above, the present invention provides a method and device for image processing, a terminal and a storage medium for solving the problems in the prior art. The image processing method is used to correct the bright spots formed by the barrel in the image, thereby improving the processing efficiency compared with the current operation of cooling the barrel.

Specifically, the present invention provides the following specific embodiments.

Embodiments of the present invention provide a method for image processing comprising:

acquiring an image generated by an infrared sighting telescope arranged on a firearm;

determining a gray level dynamic range of a preset first portion of the image, wherein the image is composed of a preset first portion and a preset second portion;

if a difference value between the gray level dynamic range value and the gray level of the preset second portion reaches a preset starting processing threshold, performing mean filtering processing on each pixel of the preset second portion to obtain a filtered gray level; and if the filtered gray level is greater than a preset gray level expectation threshold, processing the pixel, so that the gray level of the pixel is close to the gray level expectation value.

In a specific embodiment, after the acquiring an image generated by an infrared sighting telescope arranged on a firearm, the method further comprises:

denoising the image;

wherein the determining a gray level dynamic range of a preset first portion of the image comprises:

determining a gray level of each pixel of the preset first portion of the image after denoising; and determining the gray level dynamic range by counting the gray level of each pixel.

In a specific embodiment, the preset first portion and the preset second portion respectively correspond to a half region of the image; and the position of the preset first portion relative to the image is the same as the position of the infrared sighting telescope relative to the firearm.

In a specific embodiment, the starting processing threshold is determined based on the gray level of the image manually marked as not requiring processing and the image manually marked as requiring processing.

In a specific embodiment, the method further comprises:

determining a non-barrel influence region in the preset first portion based on a preset barrel influence region threshold; and determining a background threshold based on a mean gray level of the non-barrel influence region.

In a specific embodiment, the method further comprises:

determining the gray level of each pixel in each row or each column in the preset second portion; and selecting a mean value of gray levels of pixels closest to the background threshold as a gray level expectation value.

In a specific embodiment, the processing comprises:

taking a product of the filtered gray level and the background threshold as the gray level of each of the pixels.

In a specific embodiment, the method further comprises:

performing gray level smoothing on each pixel in the image after the processing is completed.

Embodiments of the present invention provide a device for image processing comprising:

an acquisition module configured for acquiring an image generated by an infrared sighting telescope arranged on a firearm;

a determination module configured for determining a gray level dynamic range of a preset first portion of the image, wherein the image is composed of a preset first portion and a preset second portion;

a mean filtering processing configured for, if a difference value between the gray level dynamic range value and the gray level of the preset second portion reaches a preset starting processing threshold, performing mean filtering processing on each pixel of the preset second portion to obtain a filtered gray level; and an adjustment module configured for, if the filtered gray level is greater than a preset gray level expectation threshold, processing the pixel, so that the gray level of the pixel is close to the gray level expectation value.

An embodiment of the present invention also proposes a terminal characterized by comprising a processor and a memory, wherein the memory has stored therein a computer program; and the processor, when executing the computer program, implements the above-mentioned method.

An embodiment of the invention also proposes a storage medium, characterized in that a computer program is stored in the storage medium, which computer program, when being executed, implements the above-mentioned method for image processing.

The embodiments of the present invention provide a method and device for image processing, a terminal and a storage medium. The method comprises acquiring an image generated by an infrared sighting telescope arranged on a firearm; determining a gray level dynamic range of a preset first portion of the image, wherein the image is composed of a preset first portion and a preset second portion; if a difference value between the gray level dynamic range value and the gray level of the preset second portion reaches a preset starting processing threshold, performing mean filtering processing on each pixel of the preset second portion to obtain a filtered gray level; and if the filtered gray level is greater than a preset gray level expectation threshold, processing the pixel, so that the gray level of the pixel is close to the gray level expectation value. In the solution, the image processing method is used to correct the speckle formed by the barrel in the image, which can automatically eliminate the speckle caused by the heat of the barrel, and ensure that we can view and aim for a long time in use the infrared sighting telescope, without affecting the shooting. Compared with the current operation of cooling the barrel, the processing efficiency is improved.

BRIEF DESCRIPTION OF DRAWINGS

In order to more clearly illustrate the technical solution of the invention, the appended drawings required for use in the embodiments are briefly introduced below. It should be understood that the appended drawings below only show certain embodiments of the invention, and therefore should not be regarded as limiting the scope of protection of the invention. In the various drawings, like components are numbered alike.

FIG. 1 is a flow chart illustrating a method for image processing according to an embodiment of the present invention;

FIG. 4 is a structure diagram of a storage medium according to an embodiment of the present invention.

DESCRIPTION OF REFERENCE NUMERALS

Figure 2:
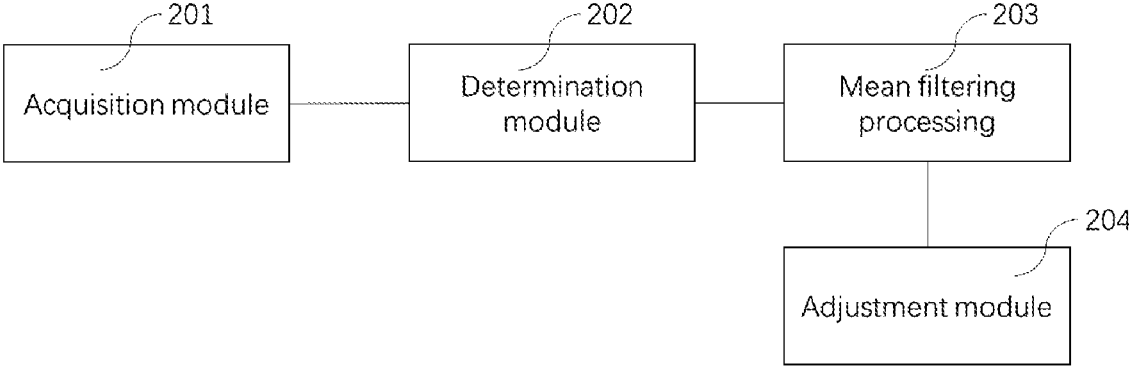
FIG. 2 is a structure diagram of a device for image processing according to an embodiment of the present invention.

201—acquisition module; 202—determination module; 203—mean filtering processing; 204—adjustment module.

DETAILED DESCRIPTION OF THE DISCLOSURE

The technical solutions in the embodiments of the invention will be described clearly and completely in conjunction with the accompanying drawings in the embodiments of the invention. Obviously, the described embodiments are only part of the embodiments of the invention, rather than all of the embodiments.

The components of the embodiments of the invention generally described and illustrated in the figures herein may be arranged and designed in a variety of different configurations. Thus, the following detailed description of the embodiments of the present invention provided in the accompanying drawings is not intended to limit the scope of the invention as claimed, but is merely representative of selected embodiments of the invention. Based on the embodiments in the invention, all other embodiments obtained by a person skilled in the art without involving any inventive effort are within the scope of protection of the invention.

In the following, the terms "comprising", "having", and their cognates, which may be used in various embodiments of the present invention, are intended only to indicate a particular feature, number, step, operation, element, component, or combination of the preceding and should not be interpreted as firstly excluding the presence of or adding one or more other features, numbers, steps, operations, elements, components, or combinations of the preceding.

Furthermore, the terms "first", "second", "third", and the like are used solely for descriptive purposes and are not to be construed as indicating or implying relative importance.

Unless otherwise defined, all terms (including technical and scientific terms) used herein have the same meaning as commonly understood by one of ordinary skill in the art to which various embodiments of the invention pertain. The terms, such as those defined in commonly used dictionaries, will be interpreted as having a meaning that is consistent with their meaning in the context of the relevant art and will not be interpreted in an idealized or overly formal sense unless expressly so defined in various embodiments of the invention.

Embodiment 1

Embodiment 1 of the present invention discloses a method for image processing, as shown in FIG. 1, including the following steps:

Step S101, acquiring an image generated by an infrared sighting telescope arranged on a firearm.

Specifically, an infrared sighting telescope is arranged on the firearm, and the infrared sighting telescope can continuously generate an image. The specific image is an infrared image.

Step S102, determining a gray level dynamic range of a preset first portion of the image, wherein the image is composed of a preset first portion and a preset second portion.

Specifically, the infrared sighting telescope is generally installed directly above the firearm. In this case, the image generated by the infrared sighting telescope can be divided into two parts, an upper half and a lower half. According to practical experience, the barrel of the firearm mainly affects the lower half. In addition, the infrared sighting telescope can also be mounted in other orientations of the firearm, e.g., in the lower part, on the left, on the right, etc.

The preset first portion and the preset second portion respectively correspond to a half region of the image; and the position of the preset first portion relative to the image is the same as the position of the infrared sighting telescope relative to the firearm.

In this way, the preset first portion corresponds to the upper half of the image and the preset second portion corresponds to the lower half of the image in the usual way of mounting, i.e., the way in which the infrared sighting telescope is mounted directly above the firearm.

If the infrared sighting telescope is mounted on the left side of the firearm, the preset first portion corresponds to a left half of the image, and the preset second portion corresponds to a right half of the image.

Specifically, based on the infrared sighting telescope being mounted at different positions of the firearm, the infrared sighting telescope may be divided into two different parts, one part corresponding to a region which is not easily influenced, and the other part corresponding to a region which is mainly influenced.

Further, the acquiring an image generated by an infrared sighting telescope arranged on a firearm, the method further includes:

denoising the image;

wherein the determining a gray level dynamic range of a preset first portion of the image includes:

determining a gray level of each pixel of the preset first portion of the image after denoising; and determining the gray level dynamic range by counting the gray level of each pixel.

Specific statistics may be performed in a histogram.

Specifically, in the case where there is no barrel influence, the image generated by the infrared sighting telescope may also have noise points. Based on this, in order to avoid the interference caused by the noise points in the image generated by the infrared sighting telescope, the image needs to be denoised first.

Other subsequent steps are performed on the denoised image.

Step S103, if a difference value between the gray level dynamic range value and the gray level of the preset second portion reaches a preset starting processing threshold, performing mean filtering processing on each pixel of the preset second portion to obtain a filtered gray level.

Specifically, the starting processing threshold is determined based on the gray level of the image manually marked as not requiring processing and the image manually marked as requiring processing.

Specifically, after the image generated by the infrared sighting telescope is acquired, manual marking can be performed. For example, when some images do not need to be processed, namely, normal images. Some images are affected by the heat of the barrel to generate bright spots, and such images are the images to be processed. By summarizing the gray level of each pixel in these images, the difference value in gray level between the normal image and the image to be processed can be confirmed. based on this, the starting processing threshold can be obtained.

The specific starting processing threshold serves to determine whether the current image needs to be corrected by executing the solution of the present solution.

Specifically, if the difference value between the gray level dynamic range value and the gray level of the preset second portion reaches a preset starting processing threshold, the processing is performed on the image. Specifically, considering that the preset second portion is a mainly influenced region, the processing is performed on each pixel of the preset second portion. Here, the processing on each pixel is mean filtering processing.

In particular, the mean filtering is also called linear filtering, and the main method used is the neighborhood average method. According to the basic principle of linear filtering, each pixel value in the original image is replaced with a mean value, namely, selecting a template for a current pixel (x, y) to be processed. The template is composed of several pixels adjacent thereto. A mean value of all the pixels in the template is calculated, and then the mean value is assigned to the current pixel (x, y) as a gray level $g(x, y)$ of the processed image at the point, namely, $g(x, y)=\Sigma f(x, y)/m$. M is the total number of pixels in the template including the current pixel.

Step S104, if the filtered gray level is greater than a preset gray level expectation threshold, processing the pixel, so that the gray level of the pixel is close to the gray level expectation value. Specifically, the processing in step S104 includes:

taking a product of the filtered gray level and the background threshold as the gray level of each of the pixels.

Specifically, for example, for a pixel 1, the filtered gray level is 70%, which is greater than the gray level expectation threshold. In this case, the processing of the pixel 1 is to multiply the filtered gray level by a background threshold. For example, the background threshold is 80%, and in this case, the gray level processed by the pixel 1 is 70%× 80%=56%.

In this way, the original gray level contrast can be taken into account, so that the processed image can preserve the details of the image as much as possible and avoid the loss of details as much as possible.

Furthermore, in step S104, the gray level expectation value is determined in manners of:

determining the gray level of each pixel in each row or each column in the preset second portion; and selecting a mean value of gray levels of pixels closest to the background threshold as a gray level expectation value.

Specifically, taking the above-mentioned as an example, if the infrared sighting telescope is arranged directly above or directly below the firearm, the gray level of each pixel in each row in the preset second portion is determined.

In addition, if the infrared sighting telescope is arranged on the left or right side of the firearm, the gray level of each pixel in each column in the preset second portion is determined.

Specifically, the region influenced by the heat of the barrel is annular. Therefore, if the infrared sighting telescope is arranged directly above the firearm and the heat of the barrel generates bright spots in the image, the shape of the bright spots will be circular or nearly circular. Therefore, the gray level is determined in a manner of each row, and the gray level of the pixel closest to the background threshold is close to both sides of each row. The middle part is influenced by the brightness of the barrel. In this case, firstly, it can select the pixel in a manner of comparing with the background threshold. In addition, the gray level of each pixel in each row can also be compared, with a pixel with the smallest gray level therein selected. After the pixels are selected, the gray levels of the selected pixels are summarized, and the mean value is taken. The mean value is a gray level expectation value.

The specific gray level expectation value is a reference for gray level adjustment of each pixel to be adjusted in the row.

The above-mentioned background threshold may be determined by the manner of:

determining a non-barrel influence region in the preset first portion based on a preset barrel influence region threshold; and determining a background threshold based on a mean gray level of the non-barrel influence region.

Specifically, the barrel influence region threshold is used for determining whether a certain region is a barrel influence region. Specifically, it can be determined based on an image which is manually marked as needing to be processed. In the image which needs to be processed specifically, a bright spot region can be further manually marked, and thus the barrel influence region threshold can be determined based on the bright spot region manually marked.

The barrel influence region in the preset second portion in the image can be determined based on the barrel influence region threshold. Thus the remaining part is the non-barrel influence region in the preset second portion in the image, and the non-barrel influence region is a normal region. The gray level of each pixel in the non-barrel influence region can be summarized to determine the background threshold.

After performing the processing in step S104 on each pixel in the preset second region in the image, an image with the bright spots removed can be obtained. Specifically, the pixels can be processed point by point in the order of rows or columns.

After step S104, gray level smoothing is performed on each pixel in the image after the processing is completed.

Specifically, in order to make the image look more natural, after the above-mentioned processing, dimming processing can also be performed on the processed image. Specifically, the gray level smoothing processing can be performed on each pixel in the image.

Furthermore, the above-mentioned process is a processing performed on the preset second portion. Since the preset second portion is a mainly influenced region, the requirements for use can already be satisfied after the processing on the preset second portion, so as to achieve a balance between an image effect and a processing speed.

In the actual process, the same processing can also be performed on the preset first portion as needed to complete the image processing of the whole image.

Embodiment 2

In order to further explain the present invention, Embodiment 2 of the present invention also discloses a device for image processing, as shown in FIG. 2, including:

an acquisition module 201 configured for acquiring an image generated by an infrared sighting telescope arranged on a firearm;

a determination module 202 configured for determining a gray level dynamic range of a preset first portion of the image, wherein the image is composed of a preset first portion and a preset second portion;

a mean filtering processing 203 configured for, if a difference value between the gray level dynamic range value and the gray level of the preset second portion reaches a preset starting processing threshold, performing mean filtering processing on each pixel of the preset second portion to obtain a filtered gray level; and an adjustment module 204 configured for, if the filtered gray level is greater than a preset gray level expectation threshold, processing the pixel, so that the gray level of the pixel is close to the gray level expectation value.

In a specific embodiment, the device further includes a pre-processing module configured for, after acquiring an image generated by an infrared sighting telescope arranged on a firearm, denoising the image;

the determination module 202 is configured for:

determining a gray level of each pixel of the preset first portion of the image after denoising; and determining the gray level dynamic range by counting the gray level of each pixel.

In a specific embodiment, the preset first portion and the preset second portion respectively correspond to a half region of the image; and the position of the preset first portion relative to the image is the same as the position of the infrared sighting telescope relative to the firearm.

In a specific embodiment, the starting processing threshold is determined based on the gray level of the image manually marked as not requiring processing and the image manually marked as requiring processing.

In a specific embodiment, the device further includes:

a background determination module configured for determining a non-barrel influence region in the preset first portion based on a preset barrel influence region threshold; and determining a background threshold based on a mean gray level of the non-barrel influence region.

In a specific embodiment, the device further includes:

a gray level expectation module configured for determining the gray level of each pixel in each row or each column in the preset second portion; and selecting a mean value of gray levels of pixels closest to the background threshold as a gray level expectation value.

In a specific embodiment, the processing includes:

taking a product of the filtered gray level and the background threshold as the gray level of each of the pixels.

In a specific embodiment, the device further includes:

a smoothing processing module for performing gray level smoothing on each pixel in the image after the processing is completed.

Embodiment 3

Figure 3:
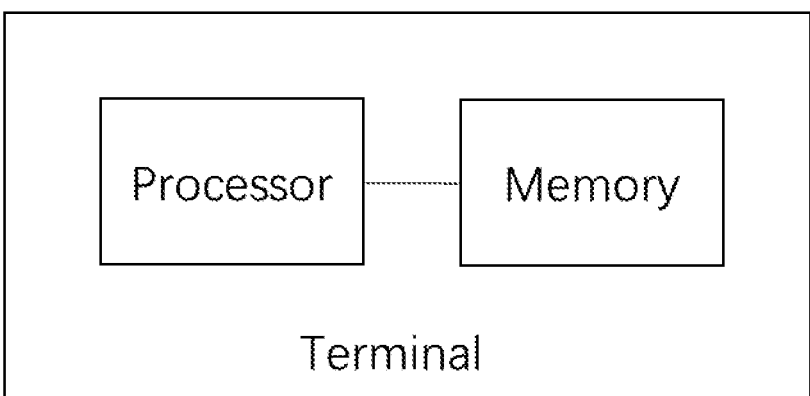
FIG. 3 is a structure diagram of a terminal according to an embodiment of the present invention.

As shown in FIG. 3, Embodiment 3 of the present invention further discloses a terminal including a processor and a memory, The terminal in the embodiments of the present invention can be an infrared-related product, for example, an infrared imaging device and an infrared sighting telescope. The terminal can include a processor and a memory. The memory may be a high-speed RAM memory or a stable memory such as a disk memory.

The memory has stored therein a computer program; and the processor, when executing the computer program, implements the following steps:

step A, acquiring an image generated by an infrared sighting telescope arranged on a firearm;

step B, determining a gray level dynamic range of a preset first portion of the image, wherein the image is composed of a preset first portion and a preset second portion;

step C, if a difference value between the gray level dynamic range value and the gray level of the preset second portion reaches a preset starting processing threshold, performing mean filtering processing on each pixel of the preset second portion to obtain a filtered gray level;

step D, if the filtered gray level is greater than a preset gray level expectation threshold, processing the pixel, so that the gray level of the pixel is close to the gray level expectation value.

In a specific embodiment, after the acquiring an image generated by an infrared sighting telescope arranged on a firearm, the method further includes:

denoising the image;

wherein the determining a gray level dynamic range of a preset first portion of the image includes:

determining a gray level of each pixel of the preset first portion of the image after denoising; and determining the gray level dynamic range by counting the gray level of each pixel.

In a specific embodiment, the preset first portion and the preset second portion respectively correspond to a half region of the image; and the position of the preset first portion relative to the image is the same as the position of the infrared sighting telescope relative to the firearm.

In a specific embodiment, the processor is further configured for:

determining a non-barrel influence region in the preset first portion based on a preset barrel influence region threshold; and determining a background threshold based on a mean gray level of the non-barrel influence region.

In a specific embodiment, the processor is further configured for:

determining the gray level of each pixel in each row or each column in the preset second portion; and selecting a mean value of gray levels of pixels closest to the background threshold as a gray level expectation value.

In a specific embodiment, the processing includes:

taking a product of the filtered gray level and the background threshold as the gray level of each of the pixels.

In a specific embodiment, the processor is further configured for:

performing gray level smoothing on each pixel in the image after the processing is completed.

Embodiment 4

Embodiment 4 of the present invention also discloses a storage medium, as shown in FIG. 4, and a computer program is stored in the storage medium, which computer program, when being executed, implements the above-mentioned method for image processing.

Specifically, the computer-readable storage medium in Embodiment 5 of the present invention can be a variety of storage media which can be read and written by a computer, such as a U disk, a mechanical hard disk, a solid state hard disk, a ROM (Read-Only Memory), a RAM (Random Access Memory), a magnetic disk or an optical disk.

The embodiments of the present invention provide a method and device for image processing, a terminal and a storage medium. The method comprises acquiring an image generated by an infrared sighting telescope arranged on a firearm; determining a gray level dynamic range of a preset first portion of the image, wherein the image is composed of a preset first portion and a preset second portion; if a difference value between the gray level dynamic range value and the gray level of the preset second portion reaches a preset starting processing threshold, performing mean filtering processing on each pixel of the preset second portion to obtain a filtered gray level; and if the filtered gray level is greater than a preset gray level expectation threshold, processing the pixel, so that the gray level of the pixel is close to the gray level expectation value. In the solution, the image processing method is used to correct the bright spots formed by the barrel in the image, which can automatically eliminate the bright spots caused by the heat of the barrel, and ensure that we can view and aim for a long time in use the infrared sighting telescope, without affecting the shooting. Compared with the current operation of cooling the barrel, the processing efficiency is improved.

In the several embodiments provided herein, it should be understood that the disclosed device and method may be implemented in other ways. The device embodiments described above are merely schematic. For example, the flow charts and block diagrams in the figures show architecture, functionality and operation of possible implementations of device, methods and computer program products according to various embodiments of the present invention. In this regard, each block in the flowchart or block diagram block may represent a module, a program segment, or part of code, which includes one or more executable instructions for implementing the specified logical functions. It should also be noted that in some alternative implementations, the functions noted in the blocks may occur differently than the order noted in the drawings. For example, two blocks in succession may, in fact, be executed substantially concurrently or they may sometimes be executed in the reverse order, depending upon the functionality involved. It is also noted that each block of the structure diagrams and/or flowcharts, and combinations of blocks in the structure diagrams and/or flowcharts, can be implemented by special purpose hardware-based systems which perform the specified functions or actions, or combinations of special purpose hardware and computer instructions.

In addition, each functional module or unit in each embodiment of the invention can be integrated together to form an independent part, or each module can exist separately, or two or more modules can be integrated to form an independent part.

The function, if implemented in the form of a software functional module and sold or used as a stand-alone product, may be stored in a computer-readable storage medium. Based on this understanding, the solution of the invention may be essentially or a part of making a contribution to the prior art or a part of the solution may be embodied in the form of a software product that is stored in a storage medium and that includes instructions for causing a computer device (which may be a smartphone, a personal computer, a server, or a network device, etc.) to perform all or part of the steps of the methods of the various embodiments of the present invention. The afore mentioned storage medium includes USB flash disk, mobile hard disk drive, read-only memory (ROM), random access memory (RAM), magnetic or optical disk and other various media capable of storing program codes.

The applicant states that the description above is only a specific embodiment of the present invention, but the scope of protection of the present invention is not limited thereto. Any changes and substitutions which can be easily made by those skilled in the art within the technical scope of the present invention disclosed are included in the scope of protection the present invention

What is claimed is:

1. A method for image processing, characterized by comprising the steps of:

acquiring an image generated by an infrared sighting telescope arranged on a firearm;

determining a gray level dynamic range of a preset first portion of the image, wherein the image is composed of a preset first portion and a preset second portion, the preset first portion and the preset second portion respectively correspond to a half region of the image; and the position of the preset first portion relative to the image is the same as the position of the infrared sighting telescope relative to the firearm;

determining a non-barrel influence region in the preset first portion based on a preset barrel influence region threshold; and determining a background threshold based on a mean gray level of the non-barrel influence region;

determining the gray level of each pixel in each row or each column in the preset second portion; and selecting a mean value of gray levels of pixels closest to the background threshold as a gray level expectation value;

if a difference value between the gray level dynamic range value and the gray level of the preset second portion reaches a preset starting processing threshold, performing mean filtering processing on each pixel of the preset second portion to obtain a filtered gray level, wherein the preset starting processing threshold is determined by the difference value in gray level between the normal image and the image to be processed; and if the filtered gray level is greater than a preset gray level expectation threshold, processing the pixel, so that the gray level of the pixel is close to the gray level expectation value, wherein the gray level expectation threshold is a mean value of the smallest gray level of pixels in each row.

2. The method according to claim 1, characterized in that, after the acquiring an image generated by an infrared sighting telescope arranged on a firearm, the method further comprises:

denoising the image;

wherein the determining a gray level dynamic range of a preset first portion of the image comprises:

determining a gray level of each pixel of the preset first portion of the image after denoising; and determining the gray level dynamic range by counting the gray level of each pixel.

3. The method according to claim 1, characterized by further comprising:

taking a product of the filtered gray level and the background threshold as the gray level of each of the pixels.

4. The method according to claim 1, characterized by further comprising:

performing gray level smoothing on each pixel in the image after the processing is completed.

5. A terminal, characterized by comprising a processor and a memory, wherein the memory has stored therein a computer program; and the processor, when executing the computer program, implements the method for image processing as claimed in claim 1.

6. The terminal according to claim 5, characterized in that, after the acquiring an image generated by an infrared sighting telescope arranged on a firearm, the method further comprises:

denoising the image;

wherein the determining a gray level dynamic range of a preset first portion of the image comprises:

determining a gray level of each pixel of the preset first portion of the image after denoising; and determining the gray level dynamic range by counting the gray level of each pixel.

7. The terminal according to claim 5, wherein the method further comprises:

taking a product of the filtered gray level and the background threshold as the gray level of each of the pixels.

8. The terminal according to claim 5, wherein the method further comprises:

performing gray level smoothing on each pixel in the image after the processing is completed.

* * * * *